Dec. 10, 1957     W. R. WEEKS     2,816,203
THERMOSTATIC CONTROL SYSTEM
Filed Dec. 20, 1956
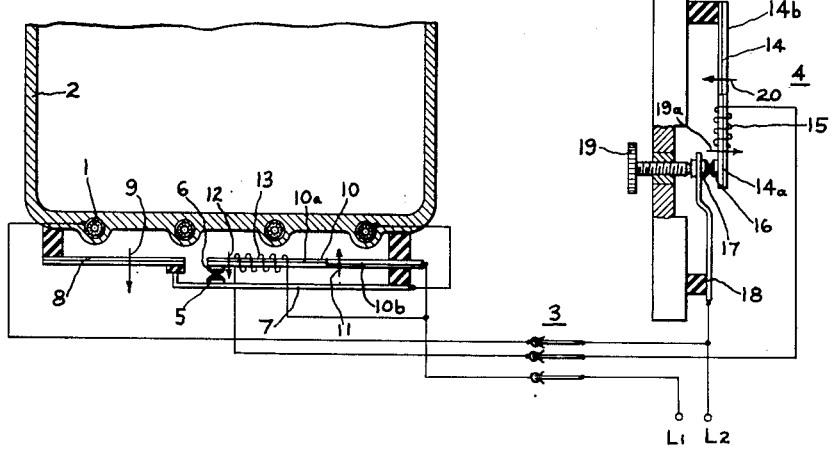
FIG. 1
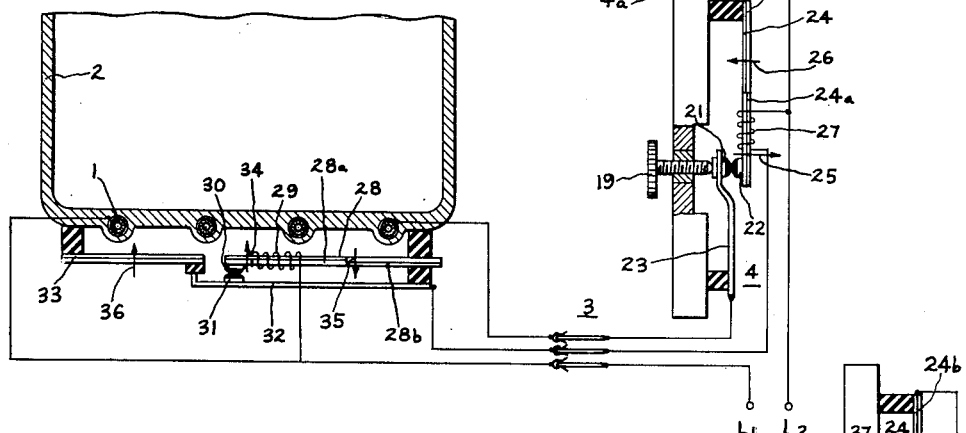
FIG. 2
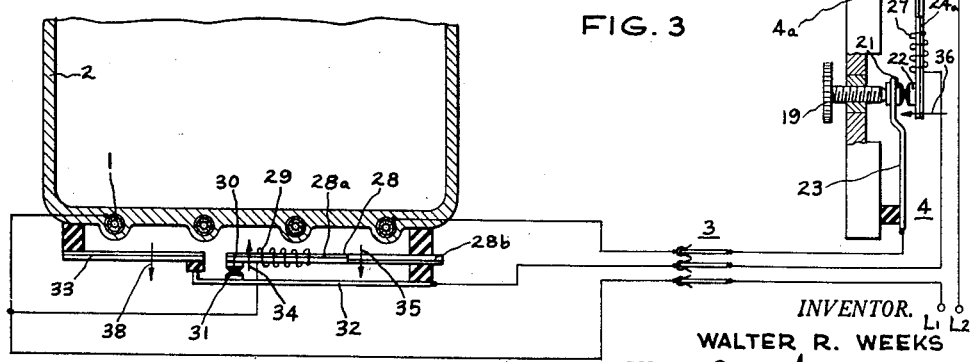
FIG. 3
INVENTOR.
WALTER R. WEEKS
BY
HIS ATTORNEY

United States Patent Office 2,816,203
Patented Dec. 10, 1957

2,816,203

THERMOSTATIC CONTROL SYSTEM

Walter R. Weeks, Louisville, Ky., assignor to General Electric Company, a corporation of New York Application December 20, 1956, Serial No. 629,519

6 Claims. (Cl. 219—20)

This invention relates to thermostatic control systems, and more specifically to a thermostatic control system particularly suitable for controlling the temperature of an electrically heated cooking utensil and its contents.

A principal object of this invention is to provide an improved manually variable control system for regulating the power input to an electric heater in accordance with the temperature of the material heated by the heater.

Further objects and advantages of the invention will become apparent as the following description proceeds, and the features of novelty which characterize the invention will be pointed out with particularity in the claims annexed to and forming a part of this specification.

Briefly stated, in accordance with one aspect of this invention there is provided a control system for the electric heating unit of a cooking utensil including a control switch contact positioned in accordance with utensil temperature, a cooperating contact carried by one of a pair of compound bimetallic arms so arranged that they assume equivalent positions in accordance with the temperature gradients along their lengths, separate heating elements for the compound bimetallic arms, and manually operable means for regulating the energization of the heating elements whereby the energization of the utensil heating unit may be remotely controlled in accordance with utensil temperature.

For a better understanding of the invention, reference may be made to the following description and the accompanying drawing in which:

Fig. 1 is a diagrammatic view of a control system embodying this invention;

Fig. 2 is similar to Fig. 1 but shows a modified form of the invention;

Fig. 3 is similar to Fig. 1 but shows another embodiment of the invention.

Referring to Fig. 1 of the drawing, the reference numeral 1 designates an electric resistance heating unit which for the purpose of illustration is shown as a coiled tubular sheath unit embedded in the bottom wall of a cooking utensil 2. The energization of heating unit 1 may, if desired, be controlled from a remote location, and accordingly in this embodiment a three conductor plug 3 may be utilized to connect the power and control wires of the utensil to power supply lines L1 and L2, and the manually operable control device 4 which, for example, may be located in the back-splasher 4a of a kitchen cabinet. Alternatively, control device 4 may be combined with utensil 2 to form a unitary appliance in which case a handle (not shown) may be provided for the utensil and arranged to contain control device 4.

Energization of heating unit 1 is controlled by a pair of switch contacts 5 and 6 connected in series with the heating unit and the power source L1 and L2, and arranged to be opened and closed so as to maintain the desired temperature. Contact 5 is carried near the free end of a cantilever support arm 7, the end of arm 7 being in engagement with a bimetallic element 8 in heat transfer relation with utensil 2. As indicated by the arrow 9, bimetallic element 8 moves downwardly as its temperature increases, and thus contact 5 is moved downwardly under these conditions. Contact 6 is positioned at the free end of a compound bimetallic cantilever arm 10 including a pair of bimetallic portions 10a and 10b joined in end-to-end heat transfer relation and oppositely disposed with respect to their directions of movement when heated, as indicated by arrows 11 and 12. The relative lengths of bimetallic portions 10a and 10b are so proportioned that the free end of cantilever arm 10 moves only when a temperature gradient is established along the length thereof. If bimetallic portions 10a and 10b have the same cross section and are made of the same materials (i. e., have equal temperature deflection characteristics) bimetal 10a should have a length approximately 2.4 times that of the effective length of bimetal 10b. An electric heating element 13 is provided to supply heat to the free end portion 10a of compound arm 10, and thus the position of contact 6 is a function of the power supplied to this heating element.

Control device 4 is provided with a second compound bimetallic arm 14, made up of bimetallic portions 14a and 14b, which is similar both in construction and function to compound bimetal 10. Compound bimetallic member 14 is provided with a heating element 15 in heat transfer relation with bimetallic portion 14a, the heating elements 13 and 15 being connected in series and so proportioned that when energized the movement of arm 10 is proportional to the movement of arm 14. The free end of compound bimetallic member 14 carries a movable contact 16 which cooperates with a manually adjustable contact 17, these contacts being connected in series with heating elements 13 and 15 and arranged to control the energization thereof. Contact 17 is carried on the free end of an arm 18 which may be moved toward and away from contact 16 by a control knob 19. Bimetallic portions 14a and 14b are arranged to move in the directions indicated by arrows 19a and 20, and thus it will be seen that whenever a temperature gradient is established along compound arm 14 is established as a result of the energization of heater 15, contact 16 will be moved away from contact 17 thus tending to de-energize the control circuit which includes heating element 13 on compound bimetallic member 10.

Referring now to the operation of the embodiment of the invention shown in Fig. 1, it will be assumed that the parts are cold (i. e., at room temperature) and that contacts 5 and 6 are open while contacts 16 and 17 are closed. When the components of the control system are arranged as shown, a circuit will be completed through line L1 to heater 13, heater 15, contacts 16 and 17, and back to line L2. Consequently, because both the heaters and compound bimetallic arms 13 and 15 have low thermal mass the free ends of these arms will quickly move in the direction indicated by the arrows 12 and 19a, this movement of arm 10 resulting in the closure of contacts 5 and 6 and the energization of heating unit 1.

Continued energization of heater 15 will increase the temperature gradient along compound arm 14 until contacts 16 and 17 open, thus de-energizing the heater. As the temperature gradients along arms 10 and 14 become stabilized, these members will oscillate slightly as contacts 16 and 17 open and close at a rate sufficient to maintain the stabilized temperature gradient along both compound arms. This position will, of course, be determined by the setting of control knob 19 and thus it will be seen that by positioning control knob 19 so as to indicate the desired temperature, contact 6 will be correspondingly positioned within its range of movement. In the meantime heating unit 1 will have been energized upon the closure of contacts 5 and 6 and the temperature of utensil 2 will have been raised, thus causing bimetal arm 8 to deflect downwardly in the direction of arrow 9. As the desired temperature is approached, contacts 5 and 6 will open, thus opening the power circuit to heating unit 1 and de-energizing the heating unit. Thereafter bimetallic element 8 will move so as to cause contacts 5 and 6 to open or close so as to maintain the desired temperature as set by control knob 19.

It will be understood that if utensil 2 contains water and knob 19 is positioned at a temperature setting of at least 212° F., the temperature of the utensil will remain constant so long as the water is boiling, and under these circumstances the position of bimetallic arm 8 will remain unchanged. However, compound arm 10 will oscillate in a limited path as its temperature gradient alternately increases and decreases in response to heat supplied by heater 13 each time contacts 16 and 17 close, and consequently contact 6 may either periodically engage contact 5 at intervals determined by the setting of knob 19, or it may continuously engage contact 5 if knob 19 is positioned at such a high temperature setting that the range of movement of compound arm 10 lies within the range of movement of arm 7. Thus, during boiling operations various boiling rates ranging from "simmer" to "rolling boil" may be obtained.

It will be observed that in the control system illustrated in Fig. 1, the main power contacts controlling energization of heating unit 1 are associated with utensil 2, while the control contacts 16 and 17 which regulate the flow of current to relatively low wattage heaters 13 and 14 are located in the control device 4. In some instances it may be desirable to locate the main power contacts in the control device and the relatively small control contacts on the cooking utensil, and accordingly there is shown in Fig. 2 of the drawing a modified form of the invention in which this transposition has been made. Referring to Fig. 2, heating unit 1, utensil 2, conductor 3, control device 4 and control knob 19 are generally similar to the corresponding parts shown in Fig. 1 and accordingly the same reference numerals are retained in Fig. 2. However, in this embodiment energization of heating unit 1 is controlled by a pair of power switch contacts 21 and 22 connected in series with heating unit and the power source L1 and L2 and arranged to be opened and closed so as to maintain the desired temperature. Contact 21 is carried at the free end of a manually adjustable cantilever arm 23, while contact 22 is carried at the free end of a compound bimetallic cantilever arm 24 which includes a pair of bimetallic portions 24a and 24b joined in end-to-end heat transfer relation and oppositely disposed with respect to their directions of movement which are indicated by arrows 25 and 26. As in the embodiment of Fig. 1, the relative lengths of bimetallic portions 24a and 24b are so proportioned that the free end of cantilever arm 24 moves only when a temperature gradient is established along the length thereof. An electric heating element 27 is provided to supply heat to the free end of portion 24a of compound arm 24, and thus the position of contact 22 is a function of the power supplied to this heating element. Utensil 2 is provided with a second compound bimetallic arm 28, made up of bimetallic portions 28a and 28b, which is similar both in construction and function to compound bimetal 24. Compound bimetallic member 28 is provided with a heating element 29 in heat transfer relation with bimetallic portion 28a, the heating elements 29 and 27 being connected in series across power supply lines L1 and L2. The free end of compound arm 28 carries a movable contact 30 which cooperates with a mating contact 31 carried near the free end of a cantilever support 32, the end of support 32 being in engagement with a bimetallic element 33 arranged in heat transfer relation with utensil 2. Bimetallic portions 28a and 28b are arranged to move, when heated, in the directions indicated by arrows 34 and 35, and thus it will be seen that whenever a temperature gradient along compound arm 28 is established as a result of the energization of heater 29, contact 30 will be moved away from contact 31, thus tending to de-energize the control circuit which includes heating element 27 on compound bimetallic member 24. Also, as indicated by the arrow 36, bimetallic element 33 moves upwardly as its temperature increases, and thus contact 31 is moved upwardly under these conditions.

Referring now to the operation of the control system shown in Fig. 2, it will be seen that if the parts are cold (i. e., at room temperature) and control knob 19 is turned from its off position in which contact 21 is disengaged from contact 22 to a heating position in which these contacts are closed, energization of heating unit 1 will immediately commence inasmuch as power to the heating unit is supplied through these contacts. Energization of the power circuit for heating unit 1 will take place regardless of whether or not contacts 30 and 31 in the control circuit are open or closed, but in any event contacts 30 and 31 will close as bimetal 33 warps in the direction of arrow 36 as it receives heat from utensil 2. Closure of contacts 30 and 31 energizes the control circuit including heaters 27 and 29 and thus contact 30 begins to move in the direction of arrow 34 while contact 22 begins to move in the direction of arrow 25, away from contact 21. As the energization of heaters 27 and 29 continues, contacts 30 and 31 will eventually open, and thereafter bimetallic members 24 and 28 will oscillate slightly as contacts 30 and 31 open and close at a rate sufficient to maintain a temperature gradient along their lengths indirectly determined by the setting of control knob 19. In the meantime, the heat output of heater 27 produces a temperature gradient along compound arm 24 sufficient to open contacts 21 and 22 and thus the heating unit 1 is de-energized and utensil 2 begins to cool. Bimetallic arm 33 responds to this decrease in temperature by moving in the direction opposite to that indicated by the arrow 36, thus tending to open contacts 30 and 31 so as to de-energize heater 27 and thus cause arm 24 to shift in the direction opposite that indicated by arrow 25 so as to reclose power contacts 21 and 22.

It will be observed that accidental interruption of the control circuit of the system shown in Fig. 2 (including heaters 27 and 29) would result in continuous energization of heating unit 1. Under these circumstances serious over-heating of utensil 2 might occur, and therefore, I have shown in Fig. 3 another modified form of my invention in which the power circuit of the main heating unit will be interrupted and the heating unit de-energized whenever the control circuit is interrupted. In the system illustrated in Fig. 3, all of the parts may be identical to the parts utilized in the system shown in Fig. 2, and accordingly identical reference numerals will be used in describing this third embodiment. However, the position of compound bimetal 24 is reversed so that bimetal portion 24a warps in the direction indicated by arrow 36 while bimetal portion 24b warps in the direction indicated by arrow 37 as temperature increases. Bimetallic member 33 is also reversed so that it warps in the direction indicated by arrow 38 upon an increase in its temperature.

In considering the operation of the system illustrated in Fig. 3, it will be understood that when the parts are at room temperature contacts 21 and 22 will be open thus interrupting the power circuit to heating unit 1 while contacts 30 and 31 will be closed so that the control circuit through heaters 27 and 29 will be immediately energized when the control and power circuits are completed through connector 3. Assuming that control knob 19 is initially in the off position (so that contact 21 is widely separated from contact 22) the resulting movement of compound arm 28 when the circuits are completed will open contacts 30 and 31 before compound arm 24 moves contact 22 into engagement with contact 21 and hence power will not be applied to the heating unit, although the control circuit will be periodically energized as contacts 30 and 31 cycle between open and closed positions. When control knob 19 is moved to a heating position contacts 21 and 22 immediately close thus energizing heating unit 1 so that heat is applied to utensil 2 and in turn is sensed by bimetal 33 which warps in the direction indicated by the arrow 38. Energization of heating unit 1 continues until contacts 30 and 31 are opened by bimetal 33 and consequently compound arm 24 cools so as to retract contact 22 away from contact 21. Thereafter compound arm 28 will reach a new position corresponding to the position taken by sensing bimetal 33, and thus compound arm 24 will be periodically heated so as to cause contacts 21 and 22 to open and close and thus maintain a predetermined temperature in accordance with the setting of control knob 19, or in the case of a boiling load, a predetermined boiling rate.

While I have shown and described three particular embodiments of my invention, I do not desire the invention to be limited to the particular constructions disclosed, and I intend by the appended claims to cover all modifications within the true spirit and scope of my invention.

What I claim is:

1. A thermostatic control system for an electric heating unit comprising a bimetallic element in heat transfer relation with the material heated by said heating unit, a first movable switch contact actuated by said bimetallic element, a compound bimetallic cantilever arm including a pair of bimetallic portions joined in end-to-end heat transfer relation and oppositely disposed with respect to direction of movement, the relative lengths of said bimetallic portions being so proportioned that the free end of said cantilever arm moves only when a temperature gradient is established along the length thereof, an electric heating element in heat transfer relation with the free end portion of said cantilever arm, a second movable switch contact cooperating with said first contact and actuated in accordance with movement of the free end of said cantilever arm, means for connecting said heating unit and said heating element to an electric power source, manually actuated means for regulating the current supplied to said heating element, and circuit means controlled by said contacts for supplying current to said heating unit in accordance with the temperature of said material.

2. A thermostatic control system for an electric heating unit comprising a bimetallic element in heat transfer relation with the material heated by said heating unit, a first movable switch contact actuated by said bimetallic element, first and second compound bimetallic cantilever arms each including a pair of bimetallic portions joined in en-to-end heat transfer relation and oppositely disposed with respect to direction of movement, the relative length of said bimetallic portions being so proportioned that the free ends of said cantilever arms move only when a temperature gradient is established along the length thereof, first and second electric heating elements in heat transfer relation with the free end portions of said first and second cantilever arms respectively, a second movable switch contact cooperating with said first contact and actuated in accordance with movement of the free end of said first cantilever arm, third and fourth switch contacts associated with said second cantilever arm and arranged to be opened and closed by movement of the free end thereof, manually operable means for varying the position of one of said third and fourth contacts, a control circuit including said heating elements and one of said first and third contacts connected in series, a power circuit including said heating unit and the other of said first and third contacts, and means for connecting said control circuit and said power circuit to an electric power source.

3. A thermostatic control system in accordance with claim 2 in which said third contact is connected in series with said heating elements and said first contact is connected in series with said heating unit.

4. A thermostatic control system in accordance with claim 2 in which said first contact is connected in series with said heating elements and said third contact is connected in series with said heating unit.

5. A thermostatic control system in accordance with claim 4 in which said bimetallic element is arranged to move said first contact toward said second contact as its temperature increases, said first compound bimetallic arm is arranged to move said second contact away from said first contact as the temperature gradient along its length increases, and said second compound bimetallic arm is arranged to open said third and fourth contacts when the temperature gradient along its length increases to a value determined by the position of said manually operable means.

6. A thermostatic control system in accordance with claim 4 in which said bimetallic element is arranged to move said first contact away from said second contact as its temperature increases, said first compound bimetallic arm is arranged to move said second contact away from said first contact as the temperature gradient along its length increases, and said second compound bimetallic arm is arranged to close said third and fourth contacts when the temperature gradient along its length increases to a value determined by the position of said manually operable means.

References Cited in the file of this patent

UNITED STATES PATENTS

| | | |
|---|---|---|
| 2,179,811 | Brosseau | Nov. 14, 1939 |
| 2,281,319 | Newell | Apr. 28, 1942 |
| 2,302,603 | Davis et al. | Nov. 17, 1942 |
| 2,611,070 | Chandler | Sept. 16, 1952 |